US012597626B2

(12) United States Patent
Kim

(10) Patent No.: US 12,597,626 B2
(45) Date of Patent: Apr. 7, 2026

(54) APPARATUS FOR ADHERING OF TAPE FOR RECHARGEABLE BATTERY AND METHOD USING THE SAME

(71) Applicant: LG Energy Solution, Ltd., Seoul (KR)

(72) Inventor: Byungryong Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 541 days.

(21) Appl. No.: 18/019,167

(22) PCT Filed: Feb. 4, 2022

(86) PCT No.: PCT/KR2022/001748
§ 371 (c)(1),
(2) Date: Feb. 1, 2023

(87) PCT Pub. No.: WO2022/169292
PCT Pub. Date: Aug. 11, 2022

(65) Prior Publication Data
US 2023/0282872 A1     Sep. 7, 2023

(30) Foreign Application Priority Data

Feb. 5, 2021     (KR) ........................ 10-2021-0016581

(51) Int. Cl.
*H01M 10/04*          (2006.01)
*B65H 35/00*          (2006.01)
(Continued)

(52) U.S. Cl.
CPC .... *H01M 10/0409* (2013.01); *B65H 35/0033* (2013.01); *H01M 50/105* (2021.01); *H01M 50/262* (2021.01)

(58) Field of Classification Search
CPC ........... H01M 10/0409; H01M 50/105; H01M 50/262; H01M 10/052; H01M 50/124;
(Continued)

(56) References Cited

U.S. PATENT DOCUMENTS

2006/0027331 A1     2/2006  Hirai et al.
2016/0023861 A1     1/2016  Ito et al.
(Continued)

FOREIGN PATENT DOCUMENTS

CN          102918700 A      2/2013
CN          104221182 A      12/2014
(Continued)

OTHER PUBLICATIONS

"Machine Test video NPL" from Joyeat, https://www.youtube.com/watch?v=0rzavgmgEv8 (Year: 2021).*
(Continued)

*Primary Examiner* — Lisa S Park
(74) *Attorney, Agent, or Firm* — Lerner David LLP

(57) ABSTRACT

A method of adhering a tape to a rechargeable battery is provided. The method includes contacting one surface of a rechargeable battery with an attachment surface of a tape via an attachment roller interposed therebetween, rotating the attachment roller in a first direction to adhere the tape to the one surface of the rechargeable battery maintaining a rotation of the attachment roller while moving the rechargeable battery in the direction away from the attachment roller to linearly contact the tape and one surface of the rechargeable battery and cutting the tape.

12 Claims, 6 Drawing Sheets

(51) Int. Cl.
    *H01M 50/105*    (2021.01)
    *H01M 50/262*    (2021.01)

(58) Field of Classification Search
    CPC ............. H01M 50/202; B65H 35/0033; B65H 2701/37; Y02E 60/10; Y02P 70/50
    See application file for complete search history.

(56) References Cited

U.S. PATENT DOCUMENTS

| | | | |
|---|---|---|---|
| 2018/0097210 A1* | 4/2018 | Jeung | H01M 50/598 |
| 2018/0215490 A1* | 8/2018 | Choi | H01M 10/0404 |
| 2020/0388861 A1 | 12/2020 | Kawamura et al. | |
| 2023/0268595 A1 | 8/2023 | Kim | |

FOREIGN PATENT DOCUMENTS

| | | | |
|---|---|---|---|
| CN | 105321851 A | | 2/2016 |
| EP | 4148877 A1 | | 3/2023 |
| JP | H02295856 A | | 12/1990 |
| JP | H09-100062 A | | 4/1997 |
| JP | H09100062 | * | 4/1997 |
| JP | H09283124 A | | 10/1997 |
| JP | 2019110189 A | | 7/2019 |
| JP | 2020193067 A | | 12/2020 |
| KR | 19980054925 U | | 10/1998 |
| KR | 20060050226 A | | 5/2006 |
| KR | 20070081653 A | | 8/2007 |
| KR | 101161147 B1 | | 6/2012 |
| KR | 20120080003 A | | 7/2012 |
| KR | 101224181 B1 | | 1/2013 |
| KR | 101358760 B1 | | 2/2014 |
| KR | 20140137836 A | | 12/2014 |
| KR | 101992658 B1 | | 6/2019 |
| KR | 102111445 B1 | | 5/2020 |

OTHER PUBLICATIONS

"Taping Machine video NPL" https://www.youtube.com/watch?v=mMa0Ebj6u7Y (Year: 2023).*
Extended European Search Report including Written Opinion for Application No. 23220280.4 dated Apr. 24, 2024.9 pgs.
International Search Report for Application No. PCT/KR2022/001748 mailed May 13, 2022. 3 pgs.
Search Report dated Nov. 17, 2025 from the Office Action for Chinese Application No. 202280005093.X issued Nov. 20, 2025, 3 pages.

* cited by examiner

APPARATUS FOR ADHERING OF TAPE FOR RECHARGEABLE BATTERY AND METHOD USING THE SAME

CROSS-REFERENCE TO RELATED APPLICATION

This application is a national stage entry under 35 U.S.C. § 371 of International Application No. PCT/KR2022/001748 filed on Feb. 4, 2022, which claims priority from Korean Patent Application No. 10-2021-0016581 filed in the Korean Intellectual Property Office on Feb. 5, 2021, the entire contents of which are incorporated herein by reference.

TECHNICAL FIELD

The present invention relates to an adhering method of a tape for a rechargeable battery, and more specifically, to an adhering method of a tape for a rechargeable battery that may be attached without sagging of the tape without additional equipment.

BACKGROUND ART

Recently, interest in a price increase of energy sources due to depletion of fossil fuels and environmental pollution has increased, and demand for environmentally-friendly alternative energy sources has become an indispensable factor for future life. Therefore, research on various power generation technologies such as nuclear power, solar power, wind power, and tidal power has been continuously conducted, and interest in a power storing apparatus for efficiently using energy generated as described above has also increased.

Particularly, in accordance with the development of technologies for mobile devices and an increase in demand for the mobile devices, a demand for batteries as an energy source has rapidly increased. Therefore, many studies on batteries that may satisfy various needs have been conducted.

Representatively, there are high demands on lithium rechargeable batteries such as a lithium ion battery or a lithium ion polymer battery having merits including high energy density, a good discharging voltage, and output stability.

Such rechargeable batteries are classified depending on a structure of an electrode assembly in which a positive electrode, a negative electrode, and a separator interposed between the positive electrode and the negative electrode are stacked. Representative examples thereof may include a jelly-roll type (wound-type) of electrode assembly in which a positive electrode and a negative electrode having a long sheet-like shape are wound with a separator interposed therebetween, a stacked type of electrode assembly in which a plurality of positive electrodes and negative electrodes that are cut in a predetermined size unit are sequentially stacked with separators interposed therebetween, and the like. Recently, a stack/folding type of electrode assembly in which unit cells obtained by stacking positive and negative electrodes of a predetermined unit with separators interposed therebetween, which are disposed on a separation film, are sequentially wound, has been developed as an electrode assembly having an advanced structure in which the jelly-roll type and the stack type are mixed in order to solve problems of the jelly-roll types and the stack types of electrode assemblies.

In addition, depending on the shape of the case, the rechargeable battery may be classified as a cylindrical rechargeable battery in which the electrode assembly is embedded in a cylindrical case, a prismatic rechargeable battery in which the electrode assembly is embedded in a prismatic case, and a pouch-type rechargeable battery in which the electrode assembly is embedded in a pouch-type case of a laminate sheet.

In the process of manufacturing such a rechargeable battery and the process of forming a battery module using a stack member of the rechargeable batteries, a process of attaching an adhesive tape is applied at various stages. For example, a process of attaching the adhesive tape to sealing the bonding part of the pouch-type case to the cylindrical case including the electrode assembly, or the bonding part of the case and the electrode lead, or attaching an adhesive tape to a portion to be fixed when stacking a plurality of rechargeable batteries, or maintaining the stack structure of the electrode assembly, may be applied.

FIG. 1 and FIG. 2 are views schematically illustrating a tape attachment process for a conventional rechargeable battery.

As shown in FIG. 1, a process of attaching a tape 300 to a rechargeable battery 100 is done by moving a fixing member 10 supporting the rechargeable battery 100 in the same direction A1 as one direction D1 on an attachment surface of the tape 300 while rotating an attachment roller 20 in one direction D1.

At this time, after completing the tape attaching in the desired area, the tape supplied through the attachment roller 20 is cut. As a method of cutting the tape, a method of applying tension to the tape by moving the fixing member 10 to be away from the attachment roller 20 is used. However, in this case, as shown in a part A, there is not enough power to cut the tape, so there is a case that the unnecessary extra tape 300 droops from the attachment roller 20 or the rechargeable battery 100. Particularly, as shown in FIG. 2, when the rechargeable battery 100 and the tape 300 are in surface contact by the pressure of the attachment roller 20 and the tension is applied to the tape 300 to be cut, a greater force is required to cut the tape 300, thereby there was a problem of causing a worse sagging phenomenon of the tape 300. When the extra tape in this stretched state is attached to the electrode lead of the rechargeable battery 100, there is a problem that welding defects may occur, and there is a problem that work efficiency may be reduced such as additional work of a worker is needed to remove the welding defects.

DISCLOSURE

Technical Problem

The problem to be solved by the present invention is to provide an adhering method of the tape for the rechargeable battery to improve the sagging problem that may occur when removing the tape without addition of a special device or process in the taping process, thereby minimizing defects and improving process efficiency.

However, the problem to be solved in the embodiments of the present invention is not limited to the foregoing problem, and may be variously extended in the scope of the technical spirit included in the present invention.

Technical Solution

An adhering method of a tape for a rechargeable battery according to an embodiment of the present invention includes contacting one surface of a rechargeable battery with an attachment surface of a tape via an attachment roller interposed therebetween; rotating the attachment roller in a first direction to adhere the tape to one surface of the rechargeable battery; maintaining the rotation of the attachment roller while moving the rechargeable battery in the direction away from the attachment roller to linear-contact the tape and one surface of the rechargeable battery; and cutting the tape.

In the linear-contacting of one surface of the rechargeable battery and the attachment surface of the tape, the attachment roller may press the rechargeable battery.

One surface of the rechargeable battery may be pressurized by including a roller cylinder at the lower part of the attachment roller.

To move the rechargeable battery in the direction away from the attachment roller may be to move the rechargeable battery in a direction perpendicular to one surface of the rechargeable battery in contact with the attachment surface of the tape.

While adhering the tape to one surface of the rechargeable battery by rotating the attachment roller in the first direction, the attachment surface of the tape and one surface of the rechargeable battery may maintain a surface-contact state with each other by the attachment roller.

The release paper that is disposed on the opposite side of the attachment surface of the tape may be separated from the tape attached to one surface of the rechargeable battery by a guide roller.

The rechargeable battery may be a pouch-type rechargeable battery in which an electrolyte solution and an electrode assembly are housed in a pouch-type case, and the attachment of the tape may be made against one surface of the pouch-type case.

The cutting of the tape may be performed by moving the rechargeable battery after the linear contact.

The cutting of the tape may further include rotating the attachment roller in a second direction opposite to the first direction.

The rechargeable battery may be supported by a fixing member supporting the rechargeable battery, and the rechargeable battery may be moved by the moving of the fixing member.

A device for attaching a tape to a rechargeable battery according to another embodiment of the present invention includes: an attachment roller that contacts an attachment surface of a tape to one surface of a rechargeable battery; a rotation roller applying a torque to the attachment roller; and a guide roller that is disposed between the attachment roller and the rotation roller to support the tape while applying tension.

The device for attaching the tape to the rechargeable battery may further include a roller cylinder connected to the lower end of the attachment roller so that the attachment roller pressurizes the rechargeable battery.

Advantageous Effects

According to the embodiments of the present invention, the adhering method of the tape for a rechargeable battery that may improve the sagging problem that may occur when removing the tape without addition of a special device or process in the taping process to minimize defects and increase process efficiency may be provided.

The effects of the present invention are not limited to the foregoing effects, and other non-mentioned effects will be clearly understood by those skilled in the art from the description below.

MODE FOR INVENTION

Figure 1:
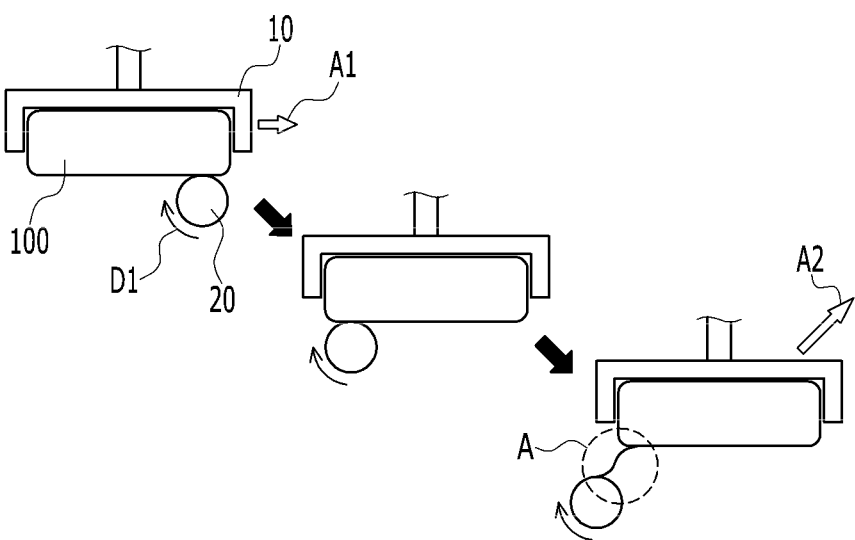
FIG. 1 is a view schematically showing a tape attachment process for a conventional rechargeable battery.
Figure 2:
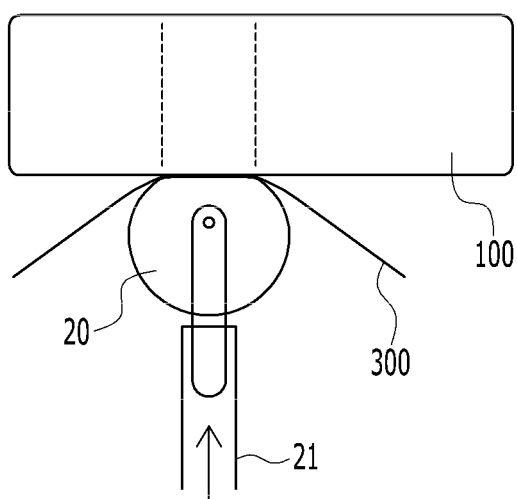
FIG. 2 is a view showing a state of a contact between a tape and a rechargeable battery by an attachment roller before cutting a tape in FIG. 1.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Parts that are irrelevant to the description are omitted in the drawings for clear description of the present invention, and like reference numerals designate like elements throughout the specification.

Further, the size and thickness of the elements shown in the drawings are arbitrarily illustrated for better understanding and ease of description, and the present invention is not necessarily limited thereto. In the drawings, the thickness of layers, films, panels, regions, etc., are exaggerated for clarity. In the drawings, for convenience of description, the thickness of layers, films, panels, areas, etc., are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise", and variations such as "comprises" or "comprising", will be understood to imply the inclusion of stated elements but not the exclusion of any other elements.

Further, throughout the specification, the phrase "on a plane" means viewing a target portion from the top, and the phrase "on a cross-section" means viewing a cross-section formed by vertically cutting a target portion from the side.

Hereinafter, an adhering method of a tape for a rechargeable battery according to an embodiment of the present invention is described with reference to 3 to FIG. 6.

Figure 3:
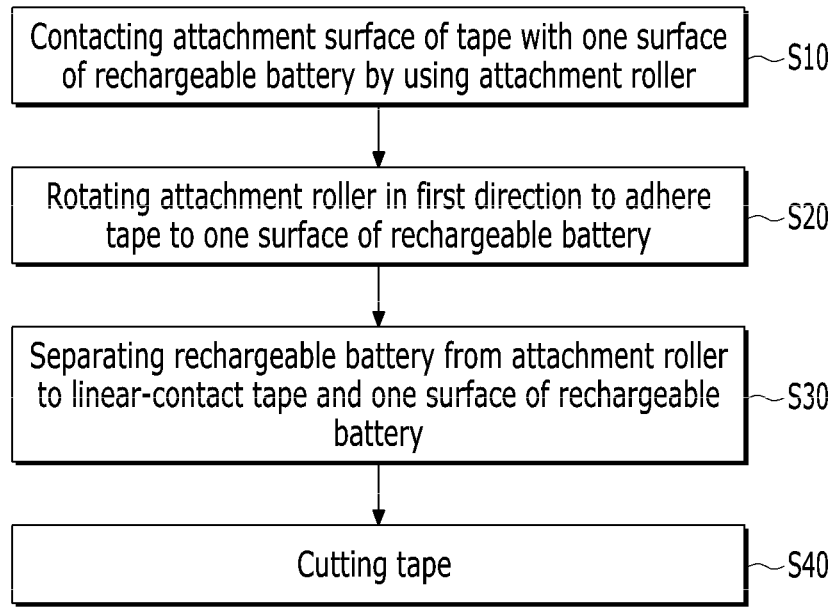
FIG. 3 is a flowchart for explaining an adhering method of a tape for a rechargeable battery according to an embodiment of the present invention.
Figure 4:
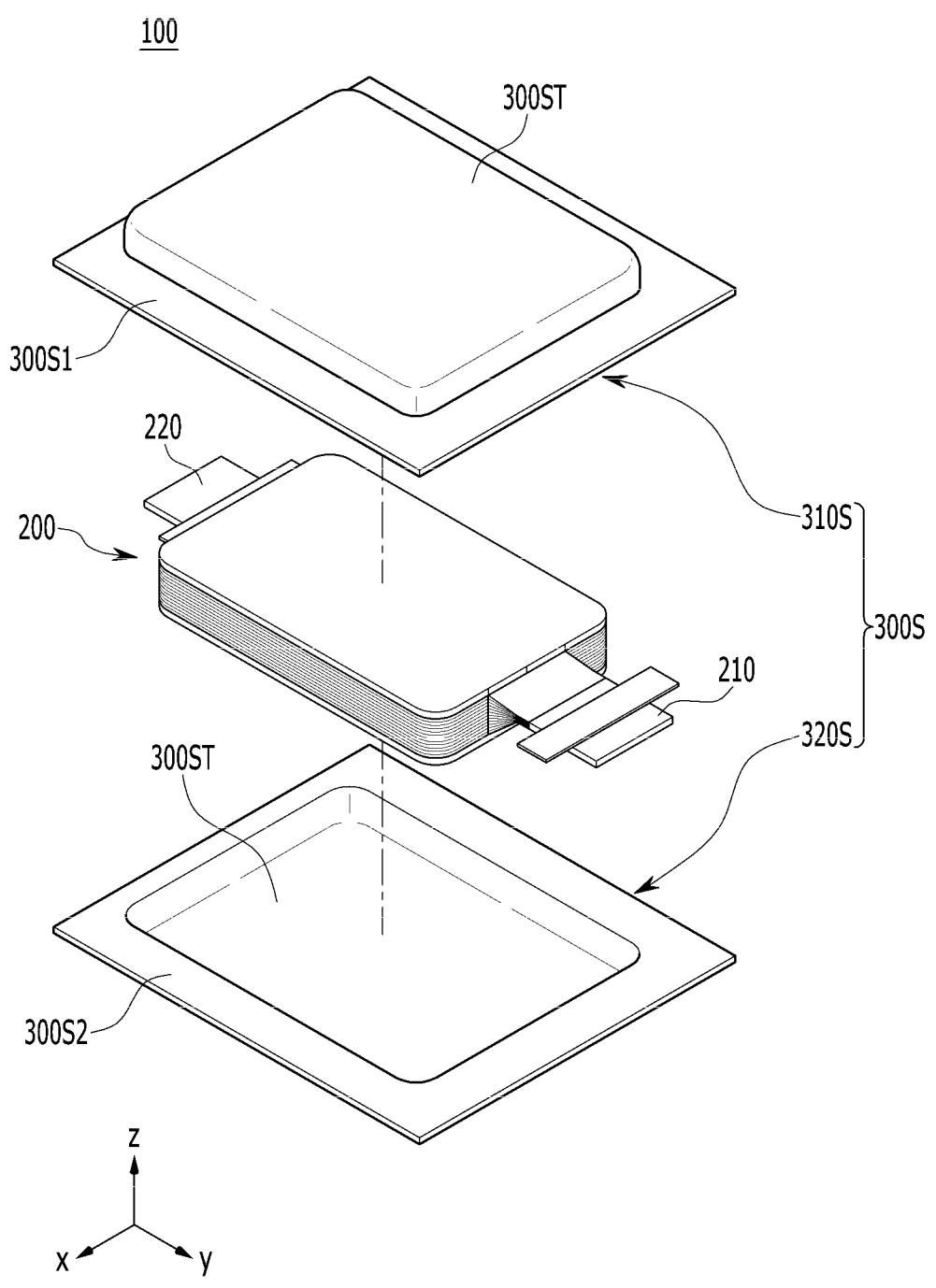
FIG. 4 is an exploded perspective view of a pouch-type rechargeable battery to which an adhering method of a tape for a rechargeable battery according to an embodiment of the present invention may be applied.
Figure 5:
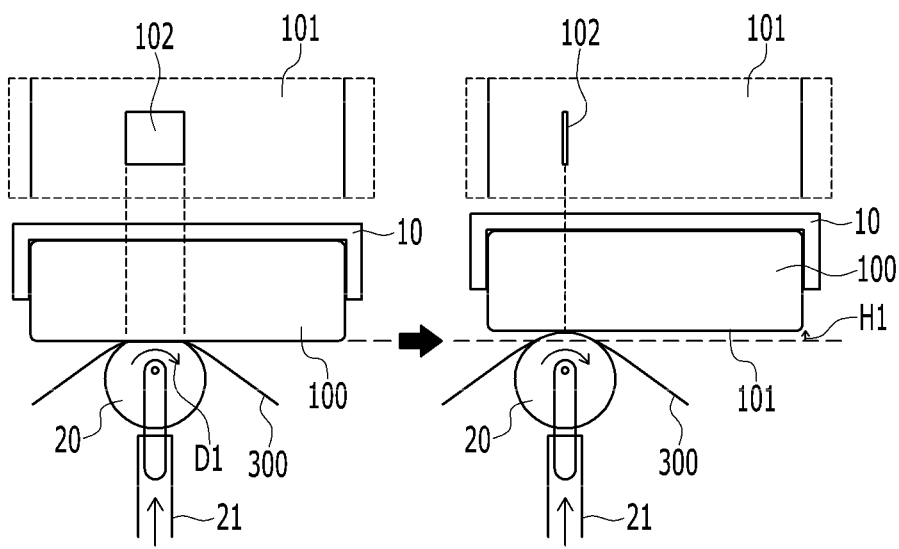
FIG. 5 is a view showing a step of linearly contacting a tape and a rechargeable battery in FIG. 3.

FIG. 3 is a flowchart for explaining an adhering method of a tape for a rechargeable battery according to an embodiment of the present invention. FIG. 4 is an exploded perspective view of a pouch-type rechargeable battery to which an adhering method of a tape for a rechargeable battery according to an embodiment of the present invention may be applied. FIG. 5 is a view showing a step of linearly contacting a tape and a rechargeable battery in FIG. 3. FIG. 6 is a view showing a step of cutting a tape in FIG. 3.

First, by using the attachment roller 20, the attachment surface 301 of the tape 300 is in contact with one surface 101 of the rechargeable battery 100 (S10).

The tape 300 (referring to FIG. 5 and FIG. 6) has an attachment surface 301, and a release paper 310 is attached to the opposite surface of the attachment surface. The tape 300 is supplied from a separate supply roller (not shown) between the attachment roller 20 and one surface of the rechargeable battery 100, that is between attachment surfaces to be attached, with the state that the attachment surface 301 is in contact with one surface 101 of the rechargeable battery 100 so that the tape 300 is interposed between the rechargeable battery 100 and the attachment roller 20. The rechargeable battery 100 is supported by the fixing member 10, and by lowering the rechargeable battery 100 toward the attachment roller 20 by the fixing member 10, one surface 101 of the rechargeable battery 100 and the attachment surface 301 of the tape 300 may be in contact.

At this time, the rechargeable battery 100 to be targeted may be of any type, and may be applied to any process to which taping is applied during the manufacturing process. In the present embodiment, the case of applying the tape to the outer surface of the pouch-type rechargeable battery is described as an example.

FIG. 4 is an exploded perspective view of a pouch-type rechargeable battery to which an adhering method of a tape for a rechargeable battery according to an embodiment of the present invention may be applied. Referring to FIG. 4, the pouch-type rechargeable battery 100 may be manufactured by accommodating the electrode assembly 200 inside the pouch-type battery case 300S and then sealing it. The electrode assembly 200 may include a positive electrode, a negative electrode, and a separator disposed between the positive electrode and the negative electrode. Each of the positive electrode and the negative electrode includes a positive electrode tab and a negative electrode tab (not shown), and a positive electrode lead 210 connected to a positive electrode tab and a negative electrode lead 220 connected to the negative electrode tab may be exposed outside the pouch-type battery case 300S. In addition, for sealing and insulation, the positive electrode lead 210 and the negative electrode lead 220 may be positioned on sealing parts 300S1 and 300S2 in a state surrounded by the lead film, respectively.

The pouch-type battery case 300S is made of a laminate sheet, and may include a resin layer for thermal fusion and a metal layer to prevent material penetration. This pouch-type battery case 300S may include an upper case 310S and a lower case 320S. In each of the upper case 310S and the lower case 320S, an accommodating part 300ST of a concave shape in which the electrode assembly 200 may be seated may be formed.

According to the outer circumference of the accommodating part 300ST, the upper case 310S, and the lower case 320S may be provided with the sealing parts 300S1 and 300S2, respectively. The sealing part 300S1 of the upper case 310S and the sealing part 300S2 of the lower case 320S are thermally fused with each other, and the pouch-type battery case 30 may be sealed with the formed sealing parts 300S1 and 300S2. That is, the resin layer in the sealing part 300S1 and the resin layer in the sealing part 300S2 may be thermally fused to each other.

On the outer surface of the rechargeable battery 100, when performing the taping for bonding the pouch-type battery case 300S, or maintaining the stacked state when constructing the stacking member by stacking a plurality of rechargeable batteries 100, the adhering method of the tape of this embodiment may be applied, but is not limited thereto.

Next, by rotating the attachment roller 20 in the first direction D1, the tape 300 is attached to one surface 101 of the rechargeable battery 100 (S20).

That is, while rotating the attachment roller 20 in the first direction D1 (a clockwise direction in the drawing), the tape 300 is attached to the part to be attached in the rechargeable battery 100. In this case, while progressing the fixing member 10 supporting the rechargeable battery 100 in the same direction (i.e., an arrow direction in the drawing) as the rotation direction of the attachment roller 20 from the surface of the rechargeable battery 100, the tape 300 may be adhered to the surface of the rechargeable battery 100 by the rotation of the attachment roller 20. The tape 300 may be attached by advancing the fixing member 10 until the tape 300 reaches the desired area. Thereby, the release paper 310 is separated and wound to the guide roller 30 side, and the tape 300 is transferred to the surface of the rechargeable battery 100.

While the attachment is in progress, the attachment roller 20 is configured to press the one surface 101 of the rechargeable battery 100 by the roller cylinder 21 connected to the lower end of the attachment roller 20. For example, pressurization may be achieved by applying air pressure of 0.5 MPa against the attachment roller 20. In this way, the tape 300 may be in contact with and attached to one surface 101 of the rechargeable battery 100 by adhering the tape 300 while pressurizing in the surface contact state.

The rotation of the attachment roller 20 may be controlled by driving the rotation motor 40 connected to the attachment roller 20 with the guide roller 30 interposed therebetween.

Next, by separating the rechargeable battery 100 from the attachment roller 20, the tape 300 and one surface 101 of the rechargeable battery 100 are in line contact (S30).

As shown in FIG. 5, By moving the rechargeable battery 100 in the direction away from the attachment roller 20, the rotation of the attachment roller 20 may be maintained so that the tape 300 and one surface 101 of the rechargeable battery 100 may be in line contact. At this time, the rechargeable battery 100 is supported by the fixing member 10, and is moved by the fixing member 10. For line contact, the rechargeable battery 100 may move in the vertical direction H1 with respect to one surface 101 of the rechargeable battery 100 in contact with the attachment surface 301 of the tape 300.

That is, in the state in which the adhering is in progress, as shown in the drawing on the left of FIG. 5, on one surface 101 of the rechargeable battery 100, the contact portion 102 is formed in a form of a surface. In FIG. 5, the lower drawing is a drawing showing the side view when the adhering is in progress, and the upper drawing, that is, the part showing one surface 101 of the rechargeable battery 100, shows the state viewing the contact portion (the lower surface of the rechargeable battery). In this state, while maintaining the rotation of the attachment roller 20 in the first direction D1, by moving only the fixing member 10 in the vertical direction H1 with respect to one surface 101 of the rechargeable battery 100, the contact portion 102 may have a line type like the drawing on the right of FIG. 5. In the linear contact state in which the contact portion 102 is linear as described above, since there is almost no contact between the tape 300 and the rechargeable battery 100 by the pressure of the attachment roller 20, the force required to cut the tape 300 may be minimized. That is, the force required to cut the tape 300 is the force to break the bonds of the molecules of the tape 300, and at this time, the force on molecules equal to the area formed by the length of the tape 300 and the basic width of the tape 300 (the length in the vertical direction in FIG. 5) affected by the pressure of the attachment roller 20 is required. However, as in an embodiment of the present invention, by making the contact portion 102 between the tape 300 and the rechargeable battery 100 linear by the pressure of the attachment roller 20, since only the force to break the intermolecular bonding as much as the portion occupied by the linear portion as the width of the tape 300 is required, it is possible to cut the tape with minimal force in the subsequent cutting process.

Next, the tape 300 is cut (S40).

Figure 6:
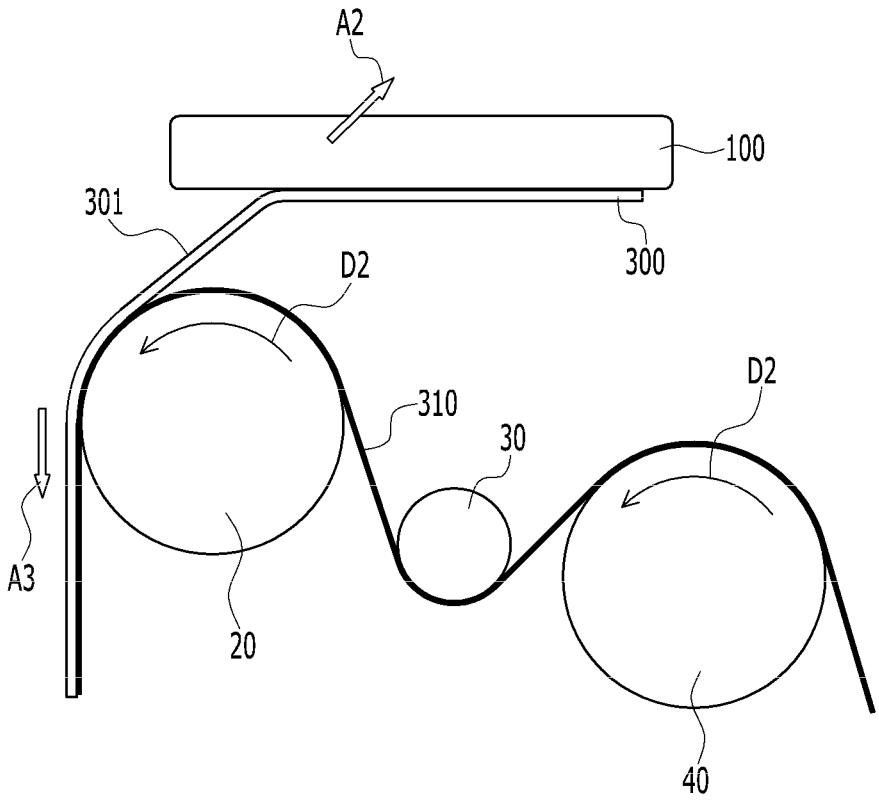
FIG. 6 is a view showing a step of cutting a tape in FIG. 3.

As shown in FIG. 6, for the cutting of the tape 300, the rechargeable battery 100 of which the attachment is completed through the movement of the fixing member 10 is moved, so that it is completely separated from the attachment roller 20 (for example, moving along the arrow A2 of the drawing). As a result, a tension is applied to the tape 300 in the arrow direction A3, and the tape 300 is cut. At this time, since the process is made in the state in which the tape 300 and one surface 101 of the rechargeable battery 100 are in line contact as in the step (S30), the force required to break the tape 300 is reduced, so that the tape 300 may be easily cut by only the tension through little movement.

Conventionally, since the cutting process was performed immediately in a state where the tape 300 and one surface 101 of the rechargeable battery 100 were in surface contact, a lot of force was required to cut the tape 300. Therefore, for the cutting, the distance to move the rechargeable battery 100 had to be increased, and also there was a problem that the tape 300 was not cut and was stretched because the power for the cutting was not sufficient. In this case, the stretched tape 300 was attached to parts other than the target to be attached, particularly the electrode leads, thereby causing welding defects, and a process was added to check whether such defective adhesion occurred, which could cause a loss in working time.

However, according the embodiment of the present invention, since the cutting is performed in the state that the tape 300 and one surface 101 of the rechargeable battery 100 are in line contact, the force required to break the tape 300 is reduced, and then the tape 300 may be easily cut with just the tension through little movement. Therefore, it is possible to cut the tape 300 strongly and accurately by adding the moving process of the rechargeable battery 100 using the fixing member 10 without additional equipment. Therefore, it is possible to prevent defects due to the tape sagging, and to omit the confirmation process for checking the tape sagging, thereby shortening the working time. In addition, the movement with acceleration for the fixing member 10 supporting the rechargeable battery 100 for cutting the tape 300 may be eliminated or minimized, which may also reduce the working time and improve the process efficiency.

In addition, in this cutting process, as shown in FIG. 6, by the reverse rotation of the rotation motor 40 in the second direction D2, additional tension may be transferred to the tape 300 to be used for the cutting. That is, by rotating the rotation motor 40 in the second direction D2 in reverse, the attachment roller 20 also rotates in the second direction D2, thereby increasing the force applied to the tape 300 in the arrow direction A3 and then breaking the tape 300 more quickly.

As above-described, according to an embodiment of the present invention, in the taping process among the manufacturing process of the rechargeable battery 100, it is possible to prevent the occurrence of the defects due to the sagging of the tape 300 by cutting the tape 300 accurately and quickly without the additional equipment, and the process efficiency may be improved by improving the processing speed.

In the present exemplary embodiment, terms indicating directions such as front, rear, left, right, up, and down, are used, but these terms are for convenience of explanation only, and may vary depending on the location of the object or the position of the observer.

A plurality of rechargeable batteries manufactured by the manufacturing method to which the tape adhering method according to the present embodiment described above is applied may form a battery module. Such a battery module may be mounted together with various control and protection systems such as a battery management system (BMS) and a cooling system to form a battery pack.

The battery module or the battery pack may be applied to various devices. Specifically, the battery module or battery pack may be applied to transportation means, such as an electric bicycle, an electric vehicle, and a hybrid vehicle, but is not limited thereto, and the battery module or battery pack may be applied to various devices that can use a secondary battery.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

DESCRIPTION OF REFERENCE NUMERALS

10: fixing member
20: attachment roller
40: rotation roller
100: rechargeable battery
200: electrode assembly
300: tape
310: release paper

The invention claimed is:

1. A method of adhering a tape to a rechargeable battery, comprising:

contacting one surface of a rechargeable battery to an attachment surface of a tape via an attachment roller to form a first contact portion, wherein the tape is interposed between the one surface of the rechargeable battery and the attachment roller;

rotating the attachment roller in a first direction to adhere the tape to the one surface of the rechargeable battery along a tape application direction;

maintaining a rotation of the attachment roller while moving the rechargeable battery in a direction away from the attachment roller to form a second contact portion, wherein the second contact portion has a width in the tape application direction smaller than a width of the first contact portion in the tape application direction; and cutting the tape after the formation of the second contact portion.

2. The method of claim 1, wherein the contacting of the top and the one surface of the rechargeable battery comprises:

pressing the rechargeable battery by the attachment roller.

3. The method of claim 2, wherein the one surface of the rechargeable battery is pressurized by a roller cylinder at a lower part of the attachment roller.

4. The method of claim 1, wherein the moving of the rechargeable battery in the direction away from the attachment roller further comprises:

moving the rechargeable battery in a direction perpendicular to the one surface of the rechargeable battery in contact with the attachment surface of the tape.

5. The method of claim 1, wherein while adhering the tape to the one surface of the rechargeable battery by rotating the attachment roller in the first direction, the attachment surface of the tape and the one surface of the rechargeable battery maintain a surface-contact state with each other by the attachment roller.

6. The method of claim 1, wherein a release paper that is disposed on an opposite side of the attachment surface of the tape is separated from the tape attached to the one surface of the rechargeable battery by a guide roller.

7. The method of claim 1, wherein the rechargeable battery is a pouch-type rechargeable battery including an electrolyte solution and an electrode assembly housed in a pouch-type case, and an attachment of the tape is made against one surface of the pouch-type case.

8. The method of claim 1, wherein the cutting of the tape is performed by moving the rechargeable battery after the linear contact.

9. The method of claim 8, wherein the cutting of the tape further includes rotating the attachment roller in a second direction opposite to the first direction.

10. The method of claim 1, wherein the rechargeable battery is supported by a fixing member supporting the rechargeable battery, and the rechargeable battery is moved by moving of the fixing member.

11. A device for attaching a tape to a rechargeable battery, comprising:

an attachment roller configured to contact an attachment surface of a tape to one surface of a rechargeable battery to adhere the tape to the one surface of the rechargeable battery along a tape application direction;

a rotation roller configured to apply a torque to the attachment roller; and a guide roller disposed between the attachment roller and the rotation roller to support the tape while applying a tension, wherein the attachment roller is configured to form a first contact portion and a second contact portion between the attachment surface of the tape and the one surface of the rechargeable battery, the second contact portion having a width in a tape application direction smaller than a width of the first contact portion in the tape application direction.

12. The device for attaching the tape to the rechargeable battery of claim 11, further comprising:

a roller cylinder connected to a lower end of the attachment roller so that the attachment roller pressurizes the rechargeable battery.

* * * * *